United States Patent Office 2,755,311
Patented July 17, 1956

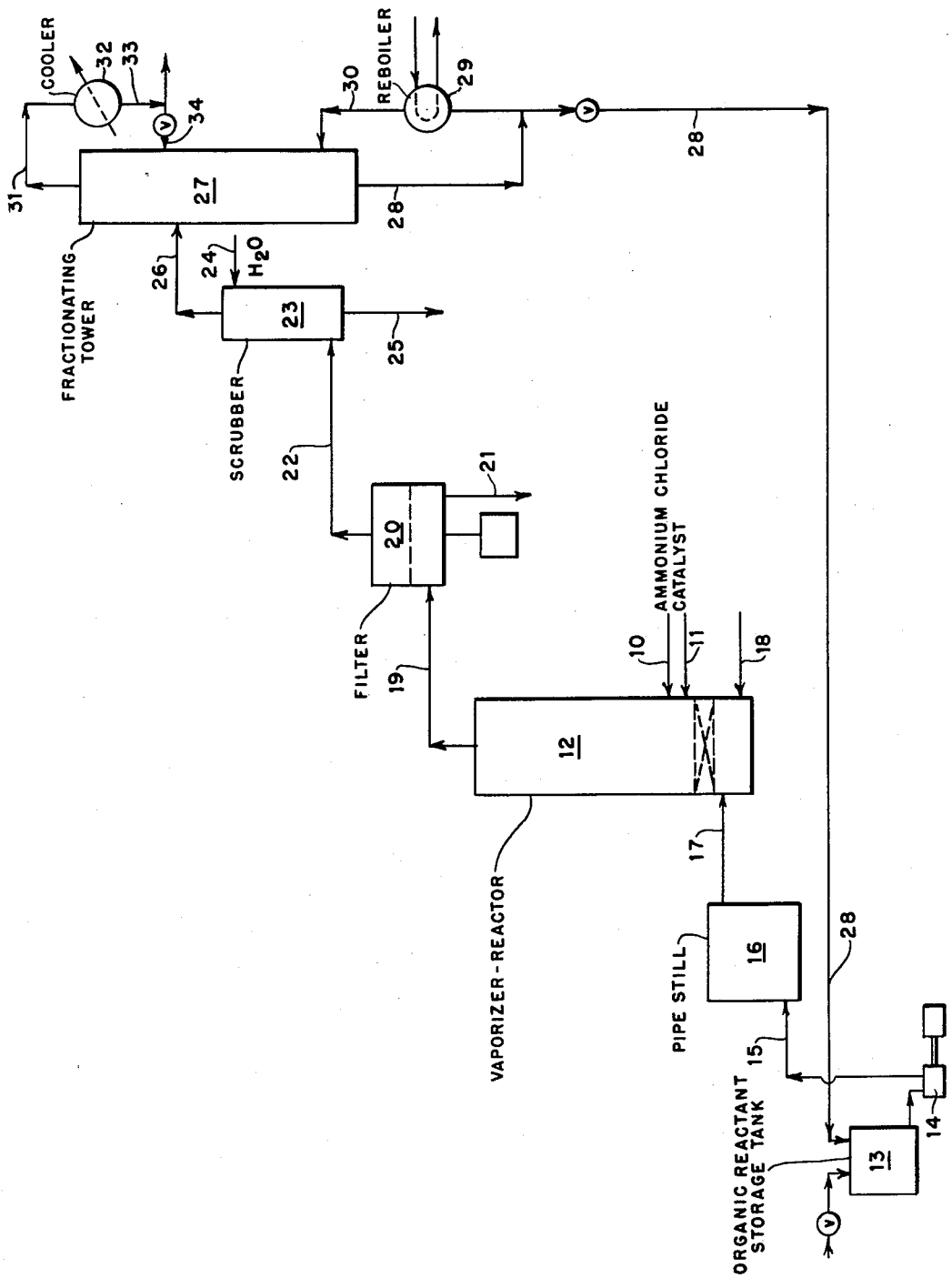

2,755,311

PRODUCTION OF ORGANIC CHLORIDES BY REACTION OF ORGANIC COMPOUND WITH AMMONIUM CHLORIDE

Hugh Spencer, Niagara Falls, N. Y., assignor to Olin Mathieson Chemical Corporation, a corporation of Virginia Application December 29, 1951, Serial No. 264,124

10 Claims. (Cl. 260—652)

My invention relates to the manufacture of organic chlorides from ammonium chloride and acetylene or organic oxygen, sulfur and nitrogen bearing compounds. In particular, my invention relates to a method of handling and contacting ammonium chloride with reactive organic compounds, in the presence of a catalyst, at elevated temperatures and in the vapor state.

Pending applications, Serial No. 243,345 filed August 23, 1951, and Serial No. 243,346 filed August 23, 1951, of John W. Churchill and Robert M. Thomas, disclose that organic compounds containing a reactive oxygen, sulfur or nitrogen group such as an alcohol, ether, aldehyde, ester or a sulfur or nitrogen analogue thereof react with ammonium halides (but not with ammonium iodide) at about 250° to 500° C. in the presence of a dehydrochlorination type catalyst of acidic to mildly alkaline character to form corresponding organic halides. The reaction with alcohols, particularly methanol and ethanol, to produce methyl and ethyl chlorides respectively is preferred. Alumina is the most effective catalyst but various activated earths and silicates, and metal halides are also effective. Temperatures of 250° to 500° C. are employed and contact time is inversely correlated with temperature. A short contact time is desired at high temperature and is obtained by control of the space velocity of the reactants. Following the reaction, the vapors pass through a recovery system usually comprising scrubbing, cooling, condensing and distillation to fractionate the reaction mixture and recover the organic halide and ammonia.

Pending application, Serial No. 243,344 filed August 23, 1951, of John W. Churchill discloses that acetylene reacts with ammonium chloride at about 250° to 500° C. in the presence of a hydrochlorination type catalyst at atmospheric pressure to form vinyl chloride. The reaction is preferably conducted at about 250° to 350° C. An excess of acetylene is used, proportions of acetylene to ammonium chloride ranging from 2:1 to 5:1. Mercury is an effective catalyst, as are chlorides of lead, bismuth, barium, magnesium, vanadium, aluminum, zinc and iron.

The desired reaction of ammonium chloride with organic substances to produce organic chlorides occurs at high temperatures, in the range of 250° to 500° C. At this reaction temperature, it is necessary for effective conversion that the ammonium chloride and organic reactant be in the vapor state. The vaporization of ammonium chloride, however, presents many difficult problems. An extraordinarily large heat input is required to vaporize ammonium chloride. About 39.6 kilocalories is required to vaporize one gram mole of ammonium chloride at 350° C. This required heat input includes not only the heat of vaporization but also the heat of dissociation of the acid and base components of the ammonium chloride. Moreover, the problem of vaporization is aggravated by the requirement that the heat must be supplied at a high temperature level to maintain the desired reaction conditions, by the tendency of ammonium chloride to sinter upon heating, by its corrosiveness and by its poor heat transfer characteristics. Its tendency to sublime further contributes to the problem of vapor phase handling since sufficient heat must be supplied to the ammonium chloride to maintain it at all times above the sublimation point in order to prevent recondensation on the first cool surface contacted. The transition from solid state to vapor state interferes with any superheat operation. Moreover, when solid ammonium chloride is contacted with a hot heat transfer surface, the small portion of the ammonium chloride in contact with the hot surface sublimes and shrinks away from the surface so that the bulk of the solid ammonium chloride is caked in a shape that has minimum contact with the heat transfer surface and thus the problem of heating and handling the mass is further aggravated. The vaporized ammonium chloride forms a film which effectively insulates the bulk of solid ammonium chloride from the heat transfer surface thereby preventing effective vaporization of the remaining solid.

Severe corrosion problems are encountered when ammonium chloride is vaporized in an external heater and then introduced into a reactor as the vaporized ammonium chloride is highly corrosive. Moreover, I have found that when vapors, either of the organic reactant or inert gases, are contacted with solid ammonium chloride in a manner promoting reaction, the ammonium chloride crystals stick together to form lumps and the entire bed sinters, resulting in poor conversion.

I have found that ammonium chloride can be effectively vaporized by suspension in a body of a particle form solid material which is maintained in a fluidized state in a manner minimizing heat transfer and corrosion difficulties associated with heating ammonium chloride in bulk.

I have found that the reaction efficiency as well as the ease of handling is promoted by vaporizing the ammonium chloride in intimate contact with the catalyst through the agency of employing the organic reactant in superheated form as the heat transfer medium and fluidizing medium. I have further found that it is essential that the ammonium chloride be diluted with the catalytic material or with an inert material to avoid lumping and sintering of the ammonium chloride during vaporization.

According to one aspect of my invention, I introduce an inert solid material in particle form into a fluidizing and vaporizing zone. The ammonium chloride may be introduced into the fluidizing and vaporizing zone in admixture with the inert solid material or separately, in solid form, to the body of inert solid material. Both solids are initially fluidized by a stream of vapors. At suitable temperatures the ammonium chloride is vaporized by the stream of vapors which may be inert or preferably may be a superheated stream of vapors of the organic reactant, for example, alcohol. The vaporized ammonium chloride, admixed with vaporized organic reactant if that was the vaporizing agent, is removed to a reaction zone. If the ammonium chloride was vaporized by a stream of inert gases only, organic reactant is added in the reaction zone. The reaction occurs in the presence of a particle form solid catalyst at a temperature of about 250° to 500° C.

In another aspect of my invention all or part of the solid material may be the catalyst, for example alumina and the fluidization, vaporization and reaction advantageously occur in the same zone. In this aspect of my invention, I have found it preferable to utilize the organic reactant vapor as both the fluidizing agent and the heat transfer means. The catalyst or solid material, however, may be fluidized in other ways. For example, the catalyst or solid material may be initially fluidized by an inert gas such as steam or nitrogen and then by superheated organic reactant vapor to vaporize and react with the ammonium chloride. In another method, the catalyst or solid material is preheated (e. g. 370° to 390° C.) and ammonium chloride is added preferably with agitation. The heat of the catalyst or solid material causes the ammonium chloride to sublime and the sublimed vapors fluidize the catalyst and inert solid material if present. Superheated vapors of the organic reactant are added to further vaporize and react with the ammonium chloride in the presence of catalyst.

My invention effectively avoids the problem of caking and the insulating effect that occurs when ammonium chloride is heated in bulk. Moreover, when catalyst is used as the suspending medium the problem of corrosiveness is minimized as the suspended ammonium chloride particles are rapidly vaporized and immediately react with the superheated organic reactant vapor thereby maintaining a minimum amount of ammonium chloride in the vapor phase.

When the ammonium chloride is vaporized and reacted in the same zone, the heat of reaction aids the vaporization of the ammonium chloride and a large reduction in heat input is realized. For example, the heat of reaction of ammonium chloride with methanol reduces the 39.6 kilocalories per gram mole of ammonium chloride required to vaporize and dissociate ammonium chloride at 350° C. by about 6 kilocalories. This reduction of 15 per cent in heat input results in a considerable heat saving in a process such as this where the heat requirement is so large. Moreover, substantially no losses in heat transfer between the heating medium and the ammonium chloride are incurred and control of the reaction is easier as the vaporization tends to absorb heat and this tends to stabilize the temperature of the mixture.

The temperature and rate of introduction of the organic reactant vapor are selected in order to obtain from the top of the vaporizing-reacting zone a mixture of completely or partially converted reagents free from the major proportion of the catalyst or solid material. The finest portion of the catalyst or solid material may remain suspended in the vapor and a filter or a cyclone separator is provided in the system to remove such fines.

The process is ordinarily operated at atmospheric pressure but may be operated at reduced or elevated pressure. However, it is particularly advantageous to operate under such conditions that the organic reactant and reaction products are vaporized at the reaction temperature. To some extent, the capacity of any particular equipment may be increased by the use of elevated pressures. The use of pressures sufficiently low to cause sublimation of ammonium chloride, particularly below the preferred reaction temperatures, is undesirable in my process.

Where ammonium chloride is suspended in finely divided catalyst, considerable reaction will occur in the zone of vaporization. The operation may be controlled so that substantially all the reaction occurs in a single zone. In a particularly advantageous form of my invention a two-stage operation is provided by employing a subsequent separate reaction zone to provide adequate time of reaction or to elevate the temperature of the reactants to complete the reaction. This method is desirable to give better control of reactant proportions and space velocities. This two-stage operation is accomplished by passing the partially reacted mixture from the first reaction zone through a separate reaction zone containing particle form catalyst in the form of a fluidized bed, a fixed bed or a moving compact bed in pill form. In operating the separate fixed bed zone, it is important that the catalyst fines be removed from the gas stream before contact with the fixed bed to avoid plugging it.

The organic reactant is sufficiently superheated to maintain the reaction gases in the reaction range of 300° to 600° C. In the case of methanol and ammonium chloride, the use of 24 moles of methanol vapor at 450° C. is sufficient to maintain the mixture at the preferred reaction temperature of 350° C. and to vaporize one mole of ammonium chloride. With methanol at 550° C., only 12 moles are required and at 650° C., only 6 moles are required. Less thermally stable reactants than methanol which cannot be heated to such temperatures may be used in this process but proportionally larger volumes must be used. Ethanol, for example, can be used up to about 450° C. in a ratio of about 24:1 and conversion of the ammonium chloride is 99 per cent or better. Where smaller proportions or organic reactant vapor are used, part of the required heat may be supplied by superheated inert gases admixed with the reactant. For this purpose steam or nitrogen, for example, may be used. Also, part of the required heat may be supplied by suitable heat transfer surfaces suspended in the bed or through the walls of the reactor or by jacketing the reaction vessel.

Usually the vapors of the organic reactant are ample to fluidize the bed and a larger proportion of catalyst to ammonium chloride is preferred. At least 60 per cent of the bed by weight is catalyst and 40 per cent is ammonium halide but larger proportions are advantageous. Up to 95 per cent or more of the bed may be catalyst in order to maintain the proper ratio of organic reactant to ammonium chloride and an adequate temperature in the bed.

The catalyst must be in particle form, advantageously in finely divided form, preferably 80 to 300 mesh, to be readily fluidized but the ammonium chloride need not be as finely or uniformly divided. Under the conditions defined above the ammonium chloride is vaporized and, while the rate of vaporization is in part determined by the state of subdivision of the solid, large particles will eventually be vaporized as well as fine particles. The fine crystals separable from the liquors of the ammonia-soda process are particularly advantageous. Wet ammonium chloride from the ammonia-soda process may also be used.

The process of my invention may be operated either continuously or batchwise. In the latter case a sufficient charge of ammonium chloride is vaporized from a suitable heated vaporizer until the charge is exhausted. It is advantageous, however, to operate the process continuously by replenishing the supply of the ammonium chloride and organic material to the vaporizers. The products may be accumulated and purified by batch methods. Continuous separation and purification of the products and return of by-product ether, amines and unreacted organic materials to the system is preferable. It is advisable to modify the details of the recovery procedure in each instance according to the physical properties of the organic reactant charged and the properties and concentration of the product. For example, when ethanol is the organic reactant, fractional distillation is probably the most economical method for recovery of ethyl chloride whereas a multi-stage extraction procedure may be more economical in the recovery of methyl chloride. In the case of methyl chloride, the reaction mixture usually comprises a mixture of methyl chloride, ammonia, small amounts of lower amines and ether, water vapor and unreacted ammonium chloride. Water scrubbing will remove in solution the ammonia, ammonium chloride, the amines and a small amount of ether. This mixture may be separated by distillation. The unabsorbed vapors comprising methyl chloride contaminated with small amounts of ether and saturated with water vapor advantageously are contacted in a second scrubbing tower with strong sulfuric acid. The ether and water vapor are absorbed by the sulfuric acid and the dried methyl chloride is recovered by condensation. The ether may be separated from the sulfuric acid by heating for recovery as a by-product or for recycle. The sulfuric acid is reconcentrated as necessary.

The process of my invention is particularly applicable to the reaction of ammonium chloride with lower aliphatic alcohols. My process has special advantages in the preparation of methyl chloride and ethyl chloride from ammonium chloride and methanol and ethanol respectively. Ethanol, for example, may be vaporized and introduced into the bottom of a bed of finely divided alumina and ammonium chloride. The superheated ethanol vapors serve to fluidize the alumina and vaporize the ammonium chloride and reaction between these components occurs with the formation of ethyl chloride and ammonia and water. In a fluidized bed of sufficient depth conversion will be sufficiently high that the reactants may be removed from the reaction zone and separated. Other aliphatic alcohols which may be used as organic reactants in our process are isopropanol, isoamyl alcohol, lauryl alcohol, and other higher aliphatic alcohols. Cycloaliphatic alcohols, for example cyclohexanol, and aromatic substituted alcohols such as benzhydrol may also be used.

The operation of my invention will be further illustrated by reference to the accompanying drawing which is a schematic flow diagram illustrating a method of operation using the catalyst as the material for suspending ammonium chloride.

In the drawing, ammonium chloride and particle form catalyst are charged as by lines 10 and 11 respectively to a vaporizing-reacting vessel 12. The organic reactant for example, alcohol, is pumped from tank 13 by means of pump 14 through line 15 to pipe still 16. In the pipe still 16, the organic reactant flows through the convection section and then through the pipe to the radiant section where it is vaporized and superheated to the desired temperature. The superheated organic reactant vapors are passed from pipe still 16 through line 17 to the vaporizing-reacting vessel 12. The superheated organic reactant vapor passes to the bottom of the vaporizing-reacting vessel 12 and up through a distributor section which supports the catalyst, for example, alumina, and ammonium chloride. The organic reactant vapor fluidizes the catalyst and vaporizes and reacts with the ammonium chloride. Alternatively, the catalyst may be fluidized by inert gas introduced as by line 18 or by preheating the catalyst and then adding ammonium chloride to the hot catalyst as by line 10. In the latter method, the catalyst is preferably stirred while the ammonium chloride is added.

The fluidized catalyst is maintained at a suitable level in the vaporizing-reacting vessel 12 and the reaction products carrying catalyst fines are passed through line 19 to a filter 20 or cyclone separator. In the case of the filter 20, it may appropriately be arranged for upflow of the reaction gases through an inert fibrous medium, for example, glass wool, which is supported and continuously or intermittently worked by means of reciprocating arms. Under these conditions the filter 20 is substantially non-clogging and accumulated materials fall to the bottom of the filter case where they are removed as by line 21.

In an alternative method of operation of my invention, a second reactor (not shown) may be provided to provide adequate reaction time or to elevate the temperature of the reactants to complete the reaction. Such secondary reactor may be substantially the same size and shape as the vaporizing-reacting vessel 12 or it may be smaller but still of the same general character. The secondary reactor is in series with the vaporizing-reacting vessel 12 and may contain particle form catalyst in the form of a fixed bed, a fluidized bed, or a moving compact bed in pill form. In the fixed bed operation the filter 20 is appropriately arranged between the two vessels so that catalyst fines from vaporizing-reacting vessel 12 are removed to prevent plugging of the fixed catalyst bed. Also, alternatively, the heated catalyst in the second zone may be circulated to the first and vice versa to utilize effectively the heat of the reaction.

The filtered reaction products are taken overhead from filter 20 through line 22 and passed into the lower portion of scrubber 23. Water is introduced to the top of scrubber 23 through line 24 in order to remove ammonia, ammonium chloride carry-over and water soluble materials such as lower amines and some lower ethers in the case of lower alcohol charging materials. The water solution is removed from the bottom of scrubber 23 through line 25 and is separately processed by distillation to recover ammonia and to fractionate the remaining water soluble materials for recycle or as by-products.

The unabsorbed vapor stream from scrubber 23 passes through line 26 to fractionating tower 27 in which separation of the organic chloride is effected. Excess unreacted organic reactant, depending upon the boiling point, may be taken as bottoms through line 28 and returned for recycle to organic reactant storage tank 13. A part of the bottom liquid product is pumped through reboiler 29 to the bottom of the column through line 30. The organic chloride product is then taken overhead through line 31 and cooler 32. The product is removed via line 33 except for the portion thereof returned to the column via line 34 for reflux.

My process will be further illustrated by reference to the following experimental examples.

*Example I*

A vertical tubular reactor 2" in diameter and 24" in length was charged with about 215 parts by weight of ammonium chloride and 320 parts by weight of alumina (80–200 mesh).

Before the operation started these substances rested on a bed support comprising a 150 mesh stainless steel distributor plate. Advantageously, a section of the reactor below this plate was filled with small glass helices resting on a 200 mesh screen. Ethanol was vaporized and superheated to 400° C. and introduced through the bottom of the reactor at a sufficient rate to maintain the alumina catalyst in suspension and vaporize adequate amounts of ammonium chloride. Additional heat may be supplied if desired through the walls of the reactor. The top of the reactor was fitted with a filter section filled, for example, with loose glass wool. The exit gases were fractionated to remove ethyl chloride overhead, ammonia, water, unreacted alcohol and by-products being removed as bottoms and charged to further fractionating towers or other means of separation of the components. Recovered alcohol, amines, ethers were recycled to the alcohol vaporizer and superheater, anhydrous or aqueous ammonia was removed as an auxiliary product and water was discarded.

*Example II*

A vaporizer-reactor was charged with 380 gms. of a mixture of activated alumina and ammonium chloride, 70 per cent of the former and 30 per cent of the latter. The alumina was 80–200 mesh and the ammonium chloride was through 80 mesh. The bed was fluidized with nitrogen until the bed tempearture reached 300° C. when nitrogen flow was stopped and methanol vapors preheated to 200° C. were introduced at a rate of 0.6 lb./hr. The superficial velocity was 0.16 ft./sec. (0.0766 ft./sec. at standard temperature and pressure). The fluidization was good. The temperature of the bed fell slowly to 240° C. during the run. The gases were passed through a glass wool filter to remove ammonium chloride and catalyst fines, through a water-cooled condenser and to a dry ice trap. The product was fractionated to obtain methyl chloride in 15 per cent conversion based on the methanol charged.

*Example III*

A mixture of 60 per cent alumina of 100–200 mesh and 40 per cent ammonium chloride was charged to a vaporizer-reactor. Hot air vapors were introduced to the bed and good fluid bed characteristics were obtained at temperatures up to 390° C.

By contrast, ammonium chloride alone was heated with hot air vapors and it was found that the crystals stuck together to form lumps and the entire bed sintered.

*Example IV*

Alumina was preheated to 370°–390° C. Ammonium chloride was added to the hot alumina with stirring. By adding small charges of ammonium chloride periodically, good fluidization was effected continuously by the sublimed vapors of the ammonium chloride.

I claim:

1. In the process of producing organic chlorides by the reaction of ammonium chloride with an organic compound reactive therewith to form an organic chloride at an elevated temperature and in the presence of a solid particle form catalyst effective to promote the reaction, the method of vaporizing the ammonium chloride and reacting the ammonium chloride dissociation products which comprises maintaining a body of the catalyst in a fluidized state in a fluidized solids-vaporizing and contact zone, suspending solid ammonium chloride in the body of fluidized catalyst in the contact zone, contacting the fluidized catalyst and ammonium chloride with superheated vapors of the reactive organic compound while maintaining a temperature of about 250° to 500° C. in the contact zone, removing the reaction vapors from the contact zone and recovering the organic chloride product.

2. The method of claim 1 in which the reactive organic compound is a lower aliphatic alcohol.

3. In the process of producing organic chlorides by the reaction of ammonium chloride with an organic compound reactive therewith to form an organic chloride at an elevated temperature and in the presence of a solid particle form catalyst effective to promote the reaction, the method of vaporizing the ammonium chloride and reacting the ammonium chloride dissociation products which comprises maintaining a body of the catalyst in a fluidized state in a fluidized solids-vaporizing and contact zone, suspending solid ammonium chloride in the body of fluidized catalyst in the contact zone, contacting the fluidized catalyst and ammonium chloride with superheated vapors of the reactive organic compound while maintaining a temperature of about 250° to 500° C. in the contact zone, removing the reaction vapors containing a mixture of ammonium chloride dissociation products and reactive organic compound to a reaction zone, reacting the mixture in the presence of a body of solid particle form catalyst in the reaction zone at a temperature of about 250° to 500° C. and recovering the organic chloride product.

4. In the process of producing organic chlorides by the reaction of ammonium chloride with an organic compound reactive therewith to form an organic chloride at an elevated temperature and in the presence of a solid particle form catalyst effective to promote the reaction, the method of vaporizing the ammonium chloride which comprises maintaining a body of an inert solid material in particle form in a fluidized state in a fluidized solids-vaporizing and contact zone, suspending solid ammonium chloride in the body of fluidized solid material in the contact zone, contacting the fluidized solid material and ammonium chloride with superheated vapors of the reactive organic compounds, reacting the mixture of ammonium chloride dissociation products and reactive organic compound in the presence of the particle form catalyst at a temperature of about 250° to 500° C. and recovering the organic chloride product.

5. The method of claim 4 in which the reaction is carried out in a separate reaction zone.

6. The method of claim 4 in which the reactive organic compound is a lower aliphatic alcohol.

7. The method of vaporizing ammonium chloride and reacting ammonium chloride dissociation products with a lower aliphatic alcohol which comprises maintaining a body of solid particle form dehydrochlorination type catalyst in a fluidized state in a fluidized solids-vaporizing and contact zone, suspending solid ammonium chloride in the body of fluidized catalyst in the contact zone, contacting the fluidized catalyst and ammonium chloride with superheated vapors of a lower aliphatic alcohol while maintaining a temperature of about 250° to 500° C. in the contact zone, removing the reaction vapors from the contact zone, and recovering the aliphatic chloride product.

8. The method of claim 7 in which the catalyst is alumina.

9. The method of claim 7 in which the alcohol is methanol.

10. The method of claim 7 in which the alcohol is ethanol.

References Cited in the file of this patent

UNITED STATES PATENTS

| | | |
|---|---|---|
| 1,812,542 | Nieuwland | June 30, 1931 |
| 2,328,430 | Dornte | Aug. 31, 1943 |
| 2,498,546 | Gorin | Feb. 21, 1950 |

FOREIGN PATENTS

| | | |
|---|---|---|
| 452,934 | Great Britain | Sept. 2, 1936 |
| 686,849 | Germany | Jan. 17, 1940 |
| 704,759 | Germany | Apr. 7, 1941 |

OTHER REFERENCES

Mellor: "Comprehensive Treatise on Inorganic and Theoretical Chemistry," vol. II, pp. 566–9; 754–4, (1922).

Rodebush et al.: "Jour. Am. Chem. Soc.," vol. 51, pp. 748–59, (1929).

Pray et al.: "Jour. Am. Chem. Soc.," vol. 70, pp. 433–4, (1948).

Stephenson: "Jour. Chem. Phys.," vol. 12, pp. 318–9, (1944).

"Chem. Abstracts," vol. 28, p. 7539, (1934). Abstract of article by Porai-Koshitz.